Nov. 12, 1940.                M. KLAVÍK                    2,221,196
                FRONT AXLE OF REAR-MOTORED AUTOMOBILES
                          Filed Aug. 29, 1939
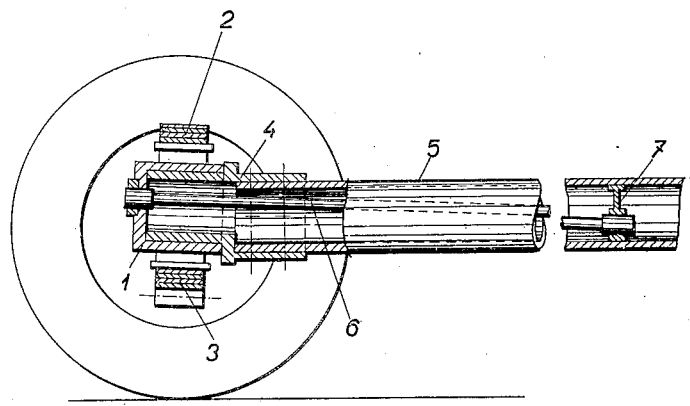
Inventor
Miloš Klavík
By
Singer, Eldert Stern & Carlberg
attys.

Patented Nov. 12, 1940

2,221,196

UNITED STATES PATENT OFFICE 2,221,196

FRONT AXLE OF REAR-MOTORED AUTOMOBILES

Miloš Klavík, Prague-Smichov, Czechoslovakia

Application August 29, 1939, Serial No. 292,519
In Czechoslovakia August 29, 1938

2 Claims. (Cl. 280—112)

In rear-motored automobiles, the front axle with the steering road wheels is generally mounted on the front end of the tubular chassis member. This front axle is usually in the form of two superposed transverse springs or two floating half-axles, each of which forms a parallelogram system of oscillating levers. These members, whether transverse springs or oscillating levers, are mounted on a suitably constructed cast or forged body secured to the front end of the tubular chassis member.

According to the invention, the body on which the transverse springs or oscillating levers are mounted is rotatably secured to the front end of the tubular chassis member so that the axis of rotation of said body lies approximately in the longitudinal axis of the vehicle or is inclined obliquely upward somewhat towards the direction of travel.

By this means, a better application of the wheels on this axle on the road is secured, because the weight of the front part of the vehicle is distributed quite uniformly on both wheels, regardless of unevennesses of the road, and in addition in the case of shocks only against one of the wheels on the axle, the connection with the chassis member is flexible and the bearing member itself is practically unstressed.

For limiting the oscillations of the rotatable body, torque spring devices are advantageously combined with the axle, for example a spring passing through the chassis member and secured between the rotatable body and an insertion inserted in the bearing member in the vicinity of its rearward end, so that the torsional forces can only act on the other end of the bearing member.

The mounting of a front axle according to the invention is shown diagrammatically in part section in the accompanying drawing.

The body 1 which carries the transverse springs 2 and 3, forming the axle, is rotatably mounted on the sleeve 4 secured to the front end of the tubular chassis member 5. The axis of the sleeve about which the body 1 rotates, extends obliquely upward somewhat towards the direction of travel. Mounted in the body 1 is the front end of the torsion rod 6, the rear end of which is gripped in the insertion 7 mounted in the vicinity of the rear end of the bearing member 5.

The construction described may be modified in various ways without departing from the scope of the invention.

I claim:

1. In a motor vehicle, a central tubular chassis the vehicle, a tubular bearing member fixedly secured to the front end of said tubular chassis member, the front part of said bearing member being positioned with its axis at an oblique angle to the horizontal axis of said tubular chassis so that the outermost end of the bearing member is arranged in a higher plane than said tubular chassis member, a body carrying transverse springs, said body being rotatably mounted on the obliquely positioned front part of said bearing member, said springs forming the axle for the front wheels of said vehicle, said body having an end wall closing the open front end of said bearing member, an insert member fixedly secured in said tubular chassis member near the rear end of the same, and a torsion rod extending lengthwise within the interior of said tubular bearing member and said tubular chassis member and fixedly attached with its ends to said end wall and said insert member respectively.

2. In a motor vehicle, a central tubular chassis member extending horizontally lengthwise of the vehicle, a tubular bearing member fixedly secured to the front end of said tubular chassis member, the front part of said bearing member being positioned with its axis at an oblique angle to the horizontal axis of said tubular chassis so that the outermost end of the bearing member is arranged in a higher plane than said tubular chassis member, a body carrying transverse springs, said body being rotatably mounted on the obliquely positioned front part of said bearing member, said springs forming the axle for the front wheels of said vehicle, one of said springs being attached to the upper part of said body and the other spring to the lower part of said body, said body having an end wall closing the open front end of said bearing member, an insert member fixedly secured in said tubular chassis member near the rear end of the same, and a torsion rod extending lengthwise within the interior of said tubular bearing member and said tubular chassis member and fixedly attached with its ends to said end wall and said insert member respectively.

MILOŠ KLAVÍK.